2,695,261

PRODUCTION OF POLYMYXINS A, B, AND E

Geoffrey Clough Ainsworth, Exeter, and Clifford George Pope, London, England, assignors to Burroughs Wellcome & Co. (U. S. A.) Inc., Tuckahoe, N. Y., a corporation of New York No Drawing. Application July 30, 1951, Serial No. 239,415

Claims priority, application Great Britain December 21, 1946

7 Claims. (Cl. 195—96)

This invention relates to a new antibiotic and to processes for the production, extraction and purification thereof.

This application is a continuation-in-part of application Serial No. 779,229, filed October 10, 1947, and based on British application Serial No. 37,619 filed December 21, 1946, now Patent No. 2,565,057.

The object of our invention is to provide a new antibiotic of good potency, especially against Gram-negative pathogenic organisms, and suitable for therapeutic use.

Most antibiotics known hitherto are products of the metabolism of moulds, such as *Penicillium notatum*. Our new antibiotic, however, is the product of the metabolism of bacillus.

The bacillus which, in accordance with our invention, we employ for the production of an antibiotic is *Bacillus aerosporus* Greer (described in Journal of Infectious Diseases, volume 42, page 508, 1928) or *Bacillus polymyxa* (Prazmowski) Migula (described in Bergey's Manual of Determinative Bacteriology, fifth edition, 1939, pages 701 to 704). These are probably two names for the same bacillus, but if the strains are indeed different we may use either.

The strain of bacillus employed in accordance with our invention may be defined also with reference to its appearance and physiological characteristics, as follows:

The organism is a bacillus, having central spores; it is motile and produces acid and gas with glucose, lactose, saccharose, mannitol, maltose, xylose, arabinose, salicin, raffinose, laevulose and inulin but not with sorbitol or inositol; is indole and methyl-red negative and gives a positive Voges-Proskauer reaction. It produces acid and clot from litmus milk; the litmus is reduced, whey separates and the clot digests. Nitrates are reduced, gelatin undergoes late saccate liquefaction, coagulated serum is liquified. There are at least two colonial variants, one being of whitish appearance and the other brown or grey. Colonies of two of the variants are smooth in outline and mucoid.

The bacillus in question is widely distributed in nature. Besides being airborne it has been found in water, soil, milk, faeces and decaying vegetables.

According to a feature of our invention we select strains of the bacillus which during metabolism yield good amounts of the desired antibiotic. This may be done by biological assay of cultures derived from separate colonies of the organism obtained by plate culture. It has been found that 5 related but distinguishable antibiotic substances may be producted from substantially pure separate colonies of the organism and these have been designated polymyxins A, B, C, D, and E (Tudor S. G. Jones, Annals of the New York Academy of Sciences, vol. 51, Art. 5, pages 909–916, June 1949). In certain cases mixtures of the related antibiotics are obtained.

The bacillus grows well on the usual culture media but antibiotic is not produced in the absence of both phosphate buffer and glucose. We have obtained best results with an aqueous medium containing 10 percent by volume of nutrient broth with the addition of 0.002 percent manganese sulphate, 3 percent glucose and 0.6 percent di-ammonium hydrogen phosphate, having a pH of approximately 7.4. The bacillus being aerobic, culture (as in the case of other aerobic bacilli) may be either in static shallow layers or in deeper vessels with artificial aeration.

To prepare the inoculum, incubation of a liquid culture of the selected strain at 37° C. for 18 to 24 hours is a suitable procedure. An inoculum of about 5 millilitres of the resulting culture may then be added to 100 millilitres of the above described nutrient medium in a flat flask and the whole incubated at 22–28° C. for 3 to 8 days. If a deep culture with artificial aeration is used, an incubation of 20–24 hours is adequate. Samples are tested for antibiotic content periodically and the culture batch harvested when the antibiotic content is substantially at a maximum.

Because the antibiotic is absorbed by filter materials, the metabolism fluid should be separated from the bacteria by centrifugation. 0.4 percent of chloroform may be added as preservative.

The metabolism fluid prepared as above described is then treated as follows (in accordance with our invention) to extract the antibiotic therefrom.

First (according to our preferred method) we make the fluid acid to a pH of approximately 2.0 to 2.5. Hydrochloric or sulphuric acids are preferably employed. Phosphoric acid may also be used as acidifying agent, but nitric acid and other oxidising acids should be avoided.

We then treat this acidified fluid with a suitable activated charcoal, whereby we absorb much of the colouring matter and other impurities present but not the antibiotic. About 0.5 percent of charcoal relatively to the weight of the solution is a suitable amount. Whether a charcoal is or is not a suitable one, that is to say whether it will absorb the colouring matter and impurities but not the antibiotic under acid conditions is a matter of simple test. The activated charcoals sold under the trade names Farnell's No. 14 and Farnell's L. S. are suitable for use in this manner.

The charcoal is then filtered off and discarded.

The filtrate, containing the antibiotic, is then made neutral (pH 6.0 to 8.0) by addition of alkali, such as caustic soda. It is then treated again with a suitable activated charcoal. This time (under neutral conditions) the antibiotic is absorbed.

The charcoal is filtered off and then the antibiotic is eluted from it by washing with aqueous acetone, of approximately 40 percent concentration by weight, maintained at a pH of approximately 2.5 with sulphuric acid. Acetone is then added to the eluate until the concentration of acetone is approximately 75 percent. This solution is then chilled to about 4° C. for about 16 hours. The solid matter, containing the antibiotic, is removed by filtration. It is then treated with water at about 30° C. The insoluble residue is filtered off and discarded.

The filtrate is brought to pH 7 by adding alkali. Further gelatinous inactive material deposits and is filtered off. The remaining solution is then frozen and dried under vacuum while frozen, yielding the crude sulphate of the desired antibiotic.

Several variations on the preferred extraction method above described are possible.

Thus the charcoal whereon the antibiotic has been adsorbed may be washed with dilute hydrochloric acid (pH 2.0 to 2.5) and/or with plain water before the elution with 40 percent acetone.

Or instead of treating the metabolism fluid with charcoal under acid conditions the charcoal may be added under neutral conditions. The antibiotic and part of the impurities are then adsorbed together upon the charcoal, which is then eluted with 40 percent acetone at a pH of approximately 2.5, the eluate being subsequently treated as previously described.

A further alternative in the process first described is to suspend the charcoal having the antibiotic adsorbed thereon in neutral ethanol, then filter off the charcoal and wash it with more ethanol. After this the antibiotic may be eluted from the charcoal with dry methanol containing approximately 3.65 grams of hydrochloric acid gas dissolved in each litre. The charcoal is filtered off and the filtrate is diluted immediately with four volumes of dry ether. The crude hydrochloride of the desired antibiotic then precipitates and is removed by filtration.

It may be redissolved in methanol, reprecipitated with ether, filtered off, washed with more ether and dried under vacuum.

A further alternative in the method first above described is to recover the antibiotic from the 40 percent acetone eluate by adjusting this to pH 7 and then evaporating off the acetone under reduced pressure. The remaining solution of the antibiotic in water is stirred with activated charcoal and filtered. The filtrate is discarded. The antibiotic is eluted from the charcoal by 40 percent aqueous acetone containing approximately 2 percent by weight of sulphuric acid. The eluate is neutralised with calcium carbonate, cooled to about 4° C. and the precipitated calcium sulphate filtered off. The filtrate is frozen and dried under vacuum while frozen, yielding the sulphate of the antibiotic.

Or after evaporation of the acetone picric acid may be added to precipitate the antibiotic as its picrate.

If it is necessary or desirable in any instance to undertake further purification of the sulphate, hydrochloride or picrate of the antibiotic produced by any of the extraction methods above described, this may be effected by conversion of the antibiotic to its helianthate. This may be done by dissolving the salt in aqueous methanol and adding a saturated solution of methyl orange. The helianthate separates after standing at 4° C. for 12 hours.

If the quantity of methyl orange added is such that about 80 percent of the antibiotic activity is associated with the precipitate, the latter contains the antibiotic in purified form, certain of the impurities remaining in the mother liquor in these circumstances. The precipitate may be washed successively with water and methanol and then treated with acid in methanol to convert the antibiotic to its soluble hydrochloride or other desired acid salt, which salt may be recovered in solid form, for example by precipitation with acetone.

Alternatively the crude sulphate of the antibiotic may be converted to the hydrochloride by treatment of the former with calcium chloride, filtering off the calcium sulphate which deposits along with certain impurities.

The new antibiotic is a fairly strong base. Its hydrochloride is extremely soluble in water and less easy to handle than its less soluble sulphate. Its helianthate is still less soluble. The base is an off-white amorphous solid. It is stable for short periods in aqueous solution at a pH of 3 to 8. It is very unstable in alkaline solutions. It cannot be extracted from aqueous solution by chloroform. It is most conveniently dissolved in water or methanol. The new antibiotic is a polypeptide yielding on hydrolysis d-leucine, epsilon methyl octanoic acid, l-threonine as the sole hydroxy amino acid, and in excess of 40 percent alpha-gamma-diaminobutyric acid as the sole basic amino acid constituent calculated as $$\frac{\text{g. amino acid}}{\text{g. polymyxin base}} \times 100$$

further characterized by the absence of dicarboxylic amino acids from the hydrolysate.

The antibiotic has been proved by in vivo experiments to have chemotherapeutic activity and give a useful degree of protection against the following pathogenic organisms: *Haemophilus pertussis, Haemophilus influenzae, Eberthella typhi, Escherichia coli* (including the haemolytic varieties thereof associated with the disease of white scour in calves) and *Brucella bronchiseptica*. It has been found to have in vitro anti-bacterial activity against all the organisms mentioned above and also against all species of Salmonella, *Pseudomonas aeruginosa, Shigella dysenteriae, Shigella paradysenteriae* and *Shigella sonnei*. It is also active against *Klebsiella pnumoniae, Sal. schottmulleri, Bacillus abortus, Aerobacter aerogenes, Sh. paradysenteriae, Pasteurella muriseptica, Past. multocida, Sal. enteritides, Sal. para typhi, Sal. pullorum, Sh. flexner, Sh. schmitz, Sh. shiga, Sh. gallinarum, Sh. sonnei* and *Pyocyaneus sepsis*. Culture specimens of the three polymyxins identified in this application are on file at the Agricultural Research Service of the United States Department of Agriculture, Peoria 5, Illinois, marked with the U. S. D. A. Type Collection numbers—

Polymyxin A—NRRL B-1550
Polymyxin B—NRRL B-1551
Polymyxin E—NRRL B-1552

We claim:
1. A process of preparing polymyxins A, B and E and mixtures thereof which comprises culturing a species of *Bacillus polymyxa* of the type selected from the class consisting of a species yielding polymyxin A, polymyxin B, polymyxin E and mixtures thereof in a proteinaceous nutrient medium containing glucose and a phosphate buffer and harvesting the product.

2. Process specified in claim 1 wherein culture takes place in a proteinaceous nutrient medium containing 3 percent glucose, 0.002 percent manganous sulphate and 0.6 per cent diammonium hydrogen sulphate.

3. The process for producing polymyxins A, B and E and mixtures thereof which comprises cultivating a species of bacteria of the type *B. polymyxa* in an aqueous medium comprising a proteinaceous material and in the presence of an assimilable carbon source and a phosphate material.

4. A process of preparing polymyxins A, B and E and mixtures thereof which comprises culturing a species of *Bacillus polymyxa* of the type selected from the class consisting of a species yielding polymyxin A, polymyxin B, polymyxin E and mixtures thereof in a proteinaceous medium containing an assimilable carbon source and a phosphate buffer and harvesting the product.

5. A process of preparing polymyxins A, B and E and mixtures thereof which comprises incubating a liquid culture of a species of *Bacillus polymyxa* of the type selected from the class consisting of a species yielding polymyxin A, polymyxin B, polymyxin E and mixtures thereof at a moderate temperature of from about 18 to 24 hours, adding an inoculum of the resulting culture to a proteinaceous nutrient medium and incubating the mixture for a period of from 3 to 8 days and harvesting the antibiotic product.

6. The process of claim 5 wherein the inoculated nutrient medium is cultured with artificial aeration for a period of from 20 to 24 hours.

7. The process of claim 5 wherein incubation of the inoculated nutrient medium is carried out at a temperature of from about 22 to 28° C.

References Cited in the file of this patent

UNITED STATES PATENTS

| Number | Name | Date |
|---|---|---|
| 2,565,057 | Ainsworth et al. | Aug. 21, 1951 |
| 2,571,104 | Benedict | Oct. 16, 1951 |

FOREIGN PATENTS

| Number | Country | Date |
|---|---|---|
| 315,263 | Great Britain | of 1930 |

OTHER REFERENCES

Tilden et al.: Jour. Bact. 43, 1942, pages 527 to 544.
Stansley et al.: Bulletin Johns Hopkins Hospital, July 1947, pages 43 to 54.
Stansley: The polymyxins, J. A. M. A. 7, December 1949, pages 807–818.
Jones, T. S. G.: "Chemical Evidence for the Multiplicity of the Antibiotics Produced by *Bacillus Polymyxa*," Ann. N. Y. Acad. Sci., 51:909, 1949.
Benedict and Stodola: Annals of the New York Academy of Sciences, vol. 51, page 866.